Dec. 15, 1953

O. S. HUBBARD ET AL 2,662,652

WRECKING TRUCK

Filed March 2, 1951

OSCAR S. HUBBARD
and
JOHN S. HUBBARD,
INVENTORS.

BY Donald E. Windle.
ATTORNEY.

Dec. 15, 1953　　　　O. S. HUBBARD ET AL　　　　2,662,652
WRECKING TRUCK
Filed March 2, 1951　　　　　　　　　　　4 Sheets-Sheet 3

OSCAR S. HUBBARD
and
JOHN S. HUBBARD,
INVENTORS.

BY Donald E. Windle
ATTORNEY.

Dec. 15, 1953   O. S. HUBBARD ET AL   2,662,652
WRECKING TRUCK

Filed March 2, 1951   4 Sheets-Sheet 4

OSCAR S. HUBBARD
and
JOHN S. HUBBARD,
INVENTORS.

BY Donald E. Windle
ATTORNEY.

Patented Dec. 15, 1953

2,662,652

UNITED STATES PATENT OFFICE 2,662,652

WRECKING TRUCK

Oscar S. Hubbard and John S. Hubbard,
Farmland, Ind.

Application March 2, 1951, Serial No. 213,634

2 Claims. (Cl. 214—86)

The present invention relates to improvements in wrecking truck construction and comprises distinct and particular improvements over the arrangement shown in United States Patent No. 1,886,681, issued to Oscar S. Hubbard November 8, 1932, with the present invention providing a more versatile mechanism than that shown and described in the above-mentioned patent.

The principal object of the invention is the provision of means providing for an expanded use of the mechanism and permitting a more varied use of the truck.

A second object is the provision of means in connection with wrecking trucks whereby the truck may be used for hoisting utility poles and analogous objects while at the same time being fully equipped for the purpose of hoisting and transporting wrecked automobiles and the like.

A third object is the provision of an improved means for pivotally securing a foot bar member in connection with the rear axle housing of a truck.

A still further object of the invention is the provision of means for operation of the foot bar member upwardly and downwardly with relation to the truck and also providing means compensating for uneven terrain where use of the mechanism is required.

A still further object is the provision of means permitting the locking of the foot bar operating means at any desired position.

Other objects and particular advantages of the invention will become apparent in the course of the following description, and that which is new will be pointed out in the appended claims.

The preferred, and most satisfactory manner of carrying out the principles of the invention is shown in the accompanying drawings, in which.

Like characters of reference designate like parts throughout the several views.

Figure 1:
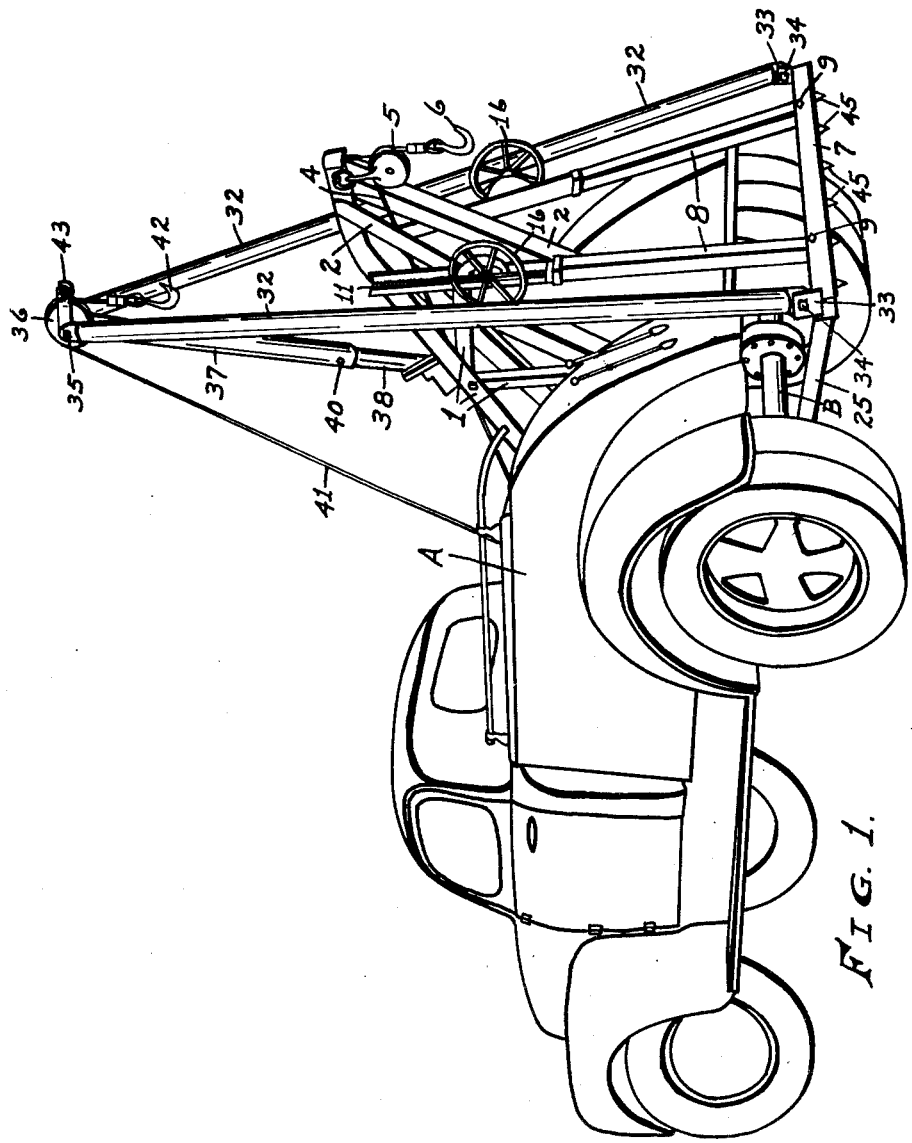
Figure 1 is a perspective view of a wrecking truck having the invention embodied in connection therewith.

In order that the advantages of the invention may be more fully understood and appreciated, we will now take up a detailed description thereof, in which the same will be more fully set forth.

Referring now to the drawings in detail, the truck is designated by letter A, with the rear axle housing thereof being designated by letter B, and with the axle shaft being shown as C.

A framework is comprised of members 1 rigidly secured to the truck body with the members of the framework extending generally upwardly and rearwardly from their fastenings with the truck body. The rearwardly-projecting members of the framework 1 are supported and braced with relation to the truck body by means of brace members 2 which are rigidly secured to the truck body in a suitable manner and with the upper ends thereof being rigidly secured to the rearward projection of the framework members.

The hoisting mechanism is composed of a drum 3 rigidly secured to the truck body and upon which cable 4 is wound, and with the free end of cable 4 being run over a sheave 5 to a hook member 6. The sheave 5 is suspended from the rear end portion of the framework, as shown in Figures 1, 2, 3 and 4. Drum 3 is operated through suitable power take-off members connected with the truck engine.

Foot bar 7 is preferably formed of an H-shaped member and is of such length as to extend substantially the overall width of the truck, with the same being rigidly secured through the lower end portions of stiff leg members 8 by means of bolts 9, or by other suitable means. Leg members 8 are preferably formed of square tube stock and with each of the leg members having an angle member 10 welded, or otherwise suitably secured, in the upper ends thereof, and extending upwardly therefrom. A gear rack member 11 is welded into the inner portion of each of the angles 10.

Figure 8:
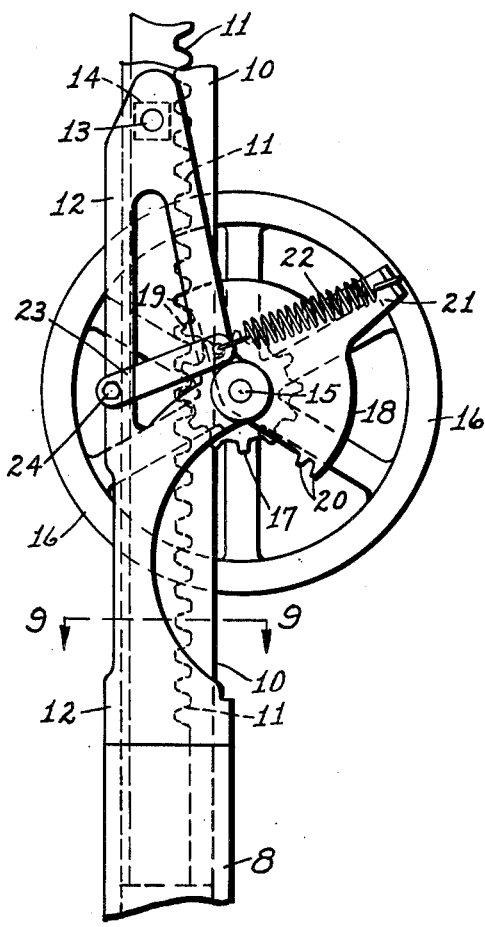
Figure 8 is a left side elevation of the right operating member of the foot bar, and with the mechanism shown as being locked in the "up" position.
Figure 9:
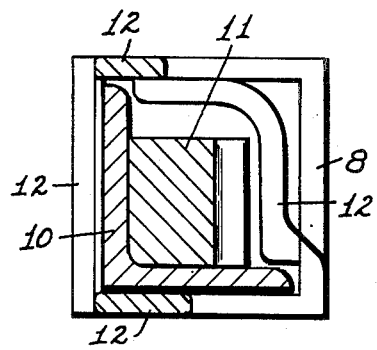
Figure 9 is a detail section through a portion of the operating mechanism, taken on line 9—9 of Figure 8.
Figure 10:
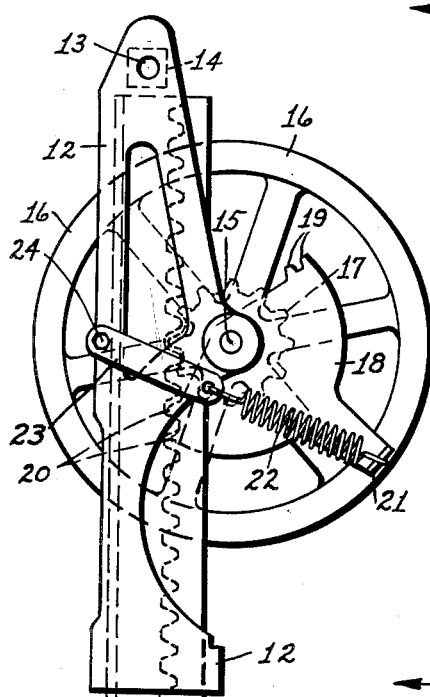
Figure 10 is a detail side elevation similar to that shown in Figure 8, but with the operating mechanism being locked in "down" position.
Figure 11:
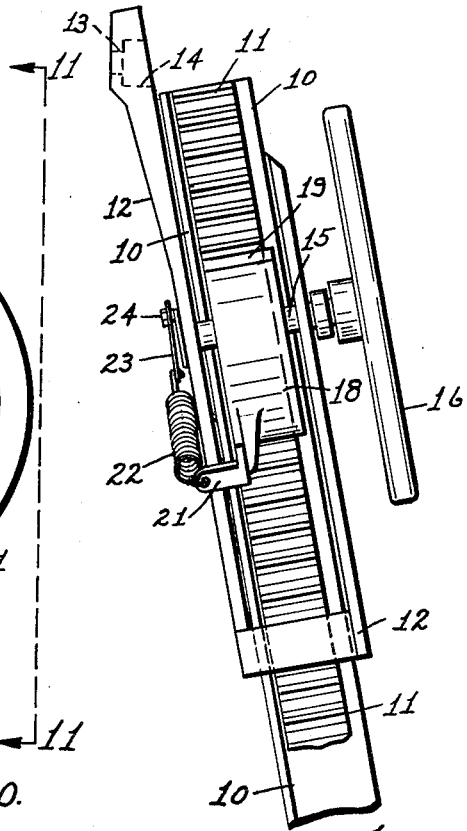
Figure 11 is a rear elevation of the raising and lowering mechanism, as taken from line 11—11 of Figure 10.
Figure 12:
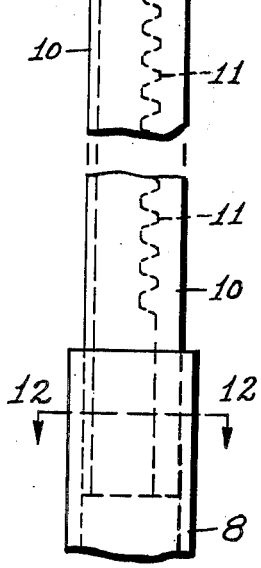
Figure 12 is a detail section through the stiff leg member taken on line 12—12 of Figure 10.

In order to operate foot bar 7 upwardly and downwardly, we have provided a housing member 12 for each of the gear racks 11, with the housing 12 providing means guiding the respective angle members 10 in their upward and downward travel. Each housing 12 is adapted to be pivotally secured to a respective framework member by means of a bolt extending through the housing and the framework member, with the bolt extending through aperture 13 near the upper end of housing 12. It will be noted also that a recess 14 is formed in the housing 12, with the recess 14 being formed to receive the head of the securing bolt. Housing 12 has shaft 15 journalled therein with the same projecting beyond one side of the housing, and with a handwheel 16 being rigidly secured on the extended portion of the shaft. Gear member 17 is rigidly secured on shaft 15 between the sides of housing 12 and is in engagement with the teeth of gear rack 11. In order to be able to lock the gear racks and the stiff leg members in desired positions, we have provided a locking member 18 for each of the gear racks. Locking members 18 are journalled on the respective shafts and have side portions which straddle the gear racks 11. Rack-engaging teeth 19 are formed across one edge of each locking member 18 and similar teeth 20 are formed across the opposite edge of each of the locking members. As indicated in Figure 10, teeth 20 are adapted to engage the gear rack teeth to lock the gear racks from upward movement with relation to housings 12. Also, as indicated in Figure 8, teeth 19 are adapted to engage the gear rack teeth to lock the gear racks against downward movement with relation to housings 12. In order to maintain the locking members 18 in either of the locking positions, we have provided an extension 21 on each of the members 18, and into which one end of a tension spring 22 is connected, and with the opposite end of the spring being connected with one end of pivotally-positioned plate 23. The opposite end of plate 23 is pivotally secured to housing 12 by means of screw 24.

Figure 5:
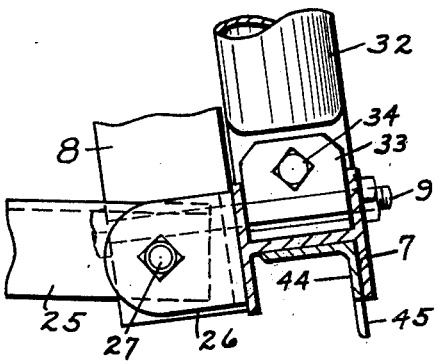
Figure 5 is a detail section through the foot bar member, taken on line 5—5 of Figure 4.
Figure 6:
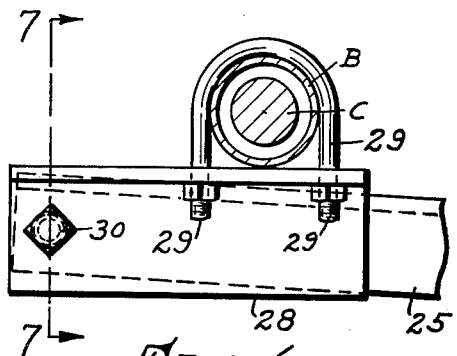
Figure 6 is a detail showing a side elevation of one of the stay bar members and showing the means of pivotally securing the same with relation to the rear axle housing of the truck.
Figure 7:
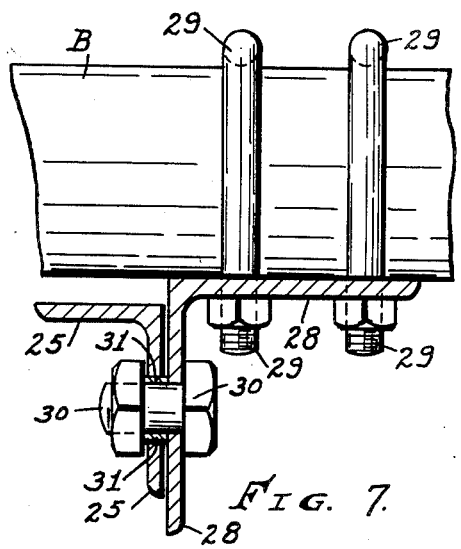
Figure 7 is a detail section through the stay bar member pivotal connection, as taken on line 7—7 of Figure 6.

Two stay bars 25 are pivotally secured to foot bar 7 by means of stirrups 26 which are rigidly secured to the forward face of bar 7 and with the rear ends of the stay bars being secured into the stirrups by means of bolts 27 extending therethrough, as shown more clearly in Figure 5. Stay bar members 25 are pivotally secured, at their forward ends, to respective stay bar supporting members 28, with each of the supporting members 28 being secured, at their rear end portions, to the rear axle housing B by means of U-bolts 29, as shown in Figures 6 and 7. The forward end portion of each of the stay members 25 is pivotally secured to the forward end portion of its supporting member 28 by means of bolt 30, and with a spacer sleeve 31 permitting free pivotal movement of the stay member with relation to the supporting member.

Figure 2:
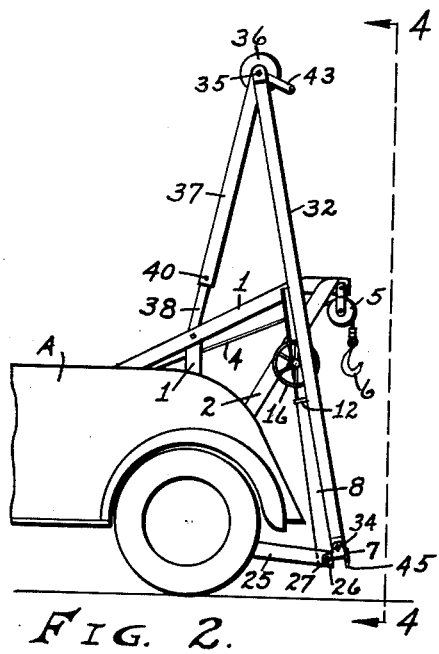
Figure 2 is a partial left side elevation of the truck showing the hoisting mechanism thereof in lifted position.
Figure 3:
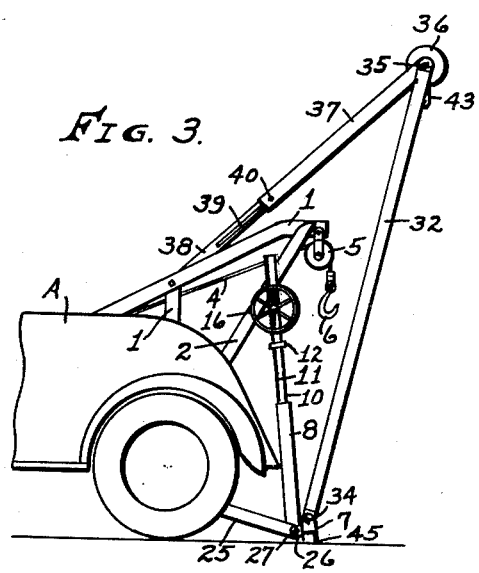
Figure 3 is a detail side elevation similar to that shown in Figure 2 but with the hoisting mechanism being shown in lowered position and with the foot member thereof being shown in contacting relation with the surface of the ground.
Figure 4:
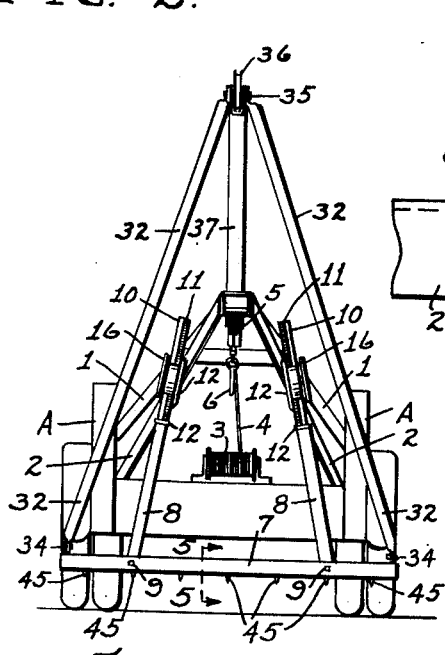
Figure 4 is a rear elevational detail of the truck and the hoisting mechanism, as taken from line 4—4 of Figure 3.

In order to provide a greater height lift, or for objects larger than automobiles, a derrick is formed of a pair of legs 32 having their lower ends pivotally secured, by means of brackets 33 and bolts 34, to the foot bar. The upper ends of the legs 32 are secured together by a bolt or shaft 35, and with a sheave 36 being positioned on the shaft between the upper ends of the legs 32. The upper ends of legs 32 are connected to the framework members by means of telescoping members 37 and 38. The upper end of member 37 is pivotally secured to the upper ends of legs 32 by means of bolt or shaft 35, with the lower end of member 38 being pivotally secured to a framework member. Member 38 is provided with a slot 39 formed therethrough and through which lower end of member 37 is slidably secured to member 38 by means of bolt 40 extending therethrough, as indicated in Figures 2 and 3.

It will be noted, by referring to Figure 1, that a cable 41, having a hook 42 on the free end thereof, may be run over sheave 36, with the cable being adapted to be wound on drum 3. A stirrup 43 is provided at the upper ends of legs 32 for attaching a block and tackle device for hoisting unusually heavy objects.

The foot bar 7 is provided with angle member 44 secured therein, with the downwardly-extending leg thereof having a plurality of points 45 formed thereon and with the points being adapted to engage the ground with the foot bar is lowered to ground-engaging position.

*Operation*

The device is normally carried in the position shown in Figures 1 and 2 with the foot bar member being positioned clear of the ground level. The device is maintained in "up" position by means of teeth 19 of locking member 18 engaging teeth of gear rack 11, as shown in Figure 8. In order to lower the foot bar to the ground level it is necessary to pivot the locking members from the position shown in Figure 8 to the position shown in Figure 10 whereupon gear 17 is rotated by means of handwheel 16, to move gear rack 11 downwardly and with teeth 20 ratcheting as the gear rack moves downwardly. Upon contact of points 45 with the ground, hand wheel 16 may be given additional rotation to force the points 45 more firmly into the ground or against a hard pavement. The load, such as an automobile, connected with hook 6 can be raised by rotation of drum 3, with the weight of the load being transferred to the ground through stiff leg members 8 and foot bar 7.

Points 45, being set firmly into the ground or against a hard pavement, provide means preventing movement of the truck when it is necessary to pull a load toward the truck from a distance.

In order to raise the foot bar 7 from the ground, locking members 18 are moved to the position shown in Figure 8, after which the racks 11 are moved upwardly by means of the gears 17 through hand wheels 16. Upward movement of racks 11 cause teeth 19 of the locking members to ratchet as the rack teeth pass teeth 19. Stoppage of the upward movement of rack bars 11 permits teeth 19 to engage the teeth of the racks 11 and thereby holding the racks, together with the stiff leg members 8 and foot bar 7 in the desired position.

When the lift is of greater height than sheave 5, hook 42 may be secured to the object to be lifted and the load carried over sheave 36 on cable 41. Should it be necessary to hoist an unusually heavy load, stirrup 43 provides means for supporting a block and tackle device. When cable 41 is used, or when a block and tackle device is used, legs 32 are pivoted from the position shown in Figures 1 and 2 to the position shown in Figure 3, with pin 40 of member 37 sliding to the upper end of slot 39 in member 38, and with the engagement of the pin with the upper end of the slot limiting the movement of the upper end of legs 32 rearwardly. Likewise, the lower end of slot 39 limits the forward movement of the upper ends of legs 32.

Movements of foot bar 7 upwardly and downwardly are controlled by means of stay bars 25 which causes the foot bar to move in an arc from the point where the bars 25 are pivotally secured to the supporting members 28.

It will be noted, from the above description and by referring to the drawings, that the housings 12 are independently supported on the framework members and the operation of one of the hand wheels 16 is independent of the other which permits adjustment of the foot bar to uneven terrain, and to provide a firm support to the stiff leg members.

The preferred embodiment of the invention is described above and shown in the drawings. However, it is desired that it be understood that minor changes may be made in the several parts and in the arrangement thereof, insofar as the changes therein may fall within the scope of the appended claims.

We claim:

1. In a wrecking truck, a rigid framework secured in the truck, a pair of raising and lowering devices, each being independent of the other, with each being pivotally secured to the framework, a geared rack extending through each of the raising and lowering members, with the geared racks being connected with a common foot bar, with the operation of the geared racks providing raising and lowering movements of the foot bar member, and with means connected with the raising and lowering devices locking the geared rack members against upward and downward movement with relation to the raising and lowering devices.

2. In a wrecking truck, a rigid framework secured in the truck, a pair of individual raising and lowering devices pivotally secured to the framework members, each of said raising and lowering devices being composed of a housing member with a shaft extending therethrough, a gear member secured on the shaft within the housing, a hand wheel secured on the shaft outside the housing, with a toothed locking member being pivotally secured on the shaft within the housing, a geared rack extending through each of the housing members with the teeth of the geared rack being meshed with the gear member, with the teeth of the locking member being engageable with the teeth of the geared rack, a foot bar member located rearwardly of the truck and connected with each of the geared racks, and with the movement of the geared racks by means of the hand wheels providing upward and downward movement to the foot bar member.

OSCAR S. HUBBARD.
JOHN S. HUBBARD.

References Cited in the file of this patent

UNITED STATES PATENTS

| Number | Name | Date |
|---|---|---|
| 1,725,952 | Beebe | Aug. 27, 1929 |
| 1,783,189 | Green | Dec. 2, 1930 |
| 1,886,681 | Hubbard | Nov. 8, 1932 |
| 1,916,869 | Stewart et al. | July 4, 1933 |
| 2,147,313 | Payson | Feb. 14, 1939 |
| 2,257,873 | Troche | Oct. 7, 1941 |
| 2,450,798 | Heinss | Oct. 5, 1948 |
| 2,470,857 | Lathers, Jr. | May 24, 1949 |
| 2,598,517 | Drott | May 27, 1952 |